Patented July 8, 1924.

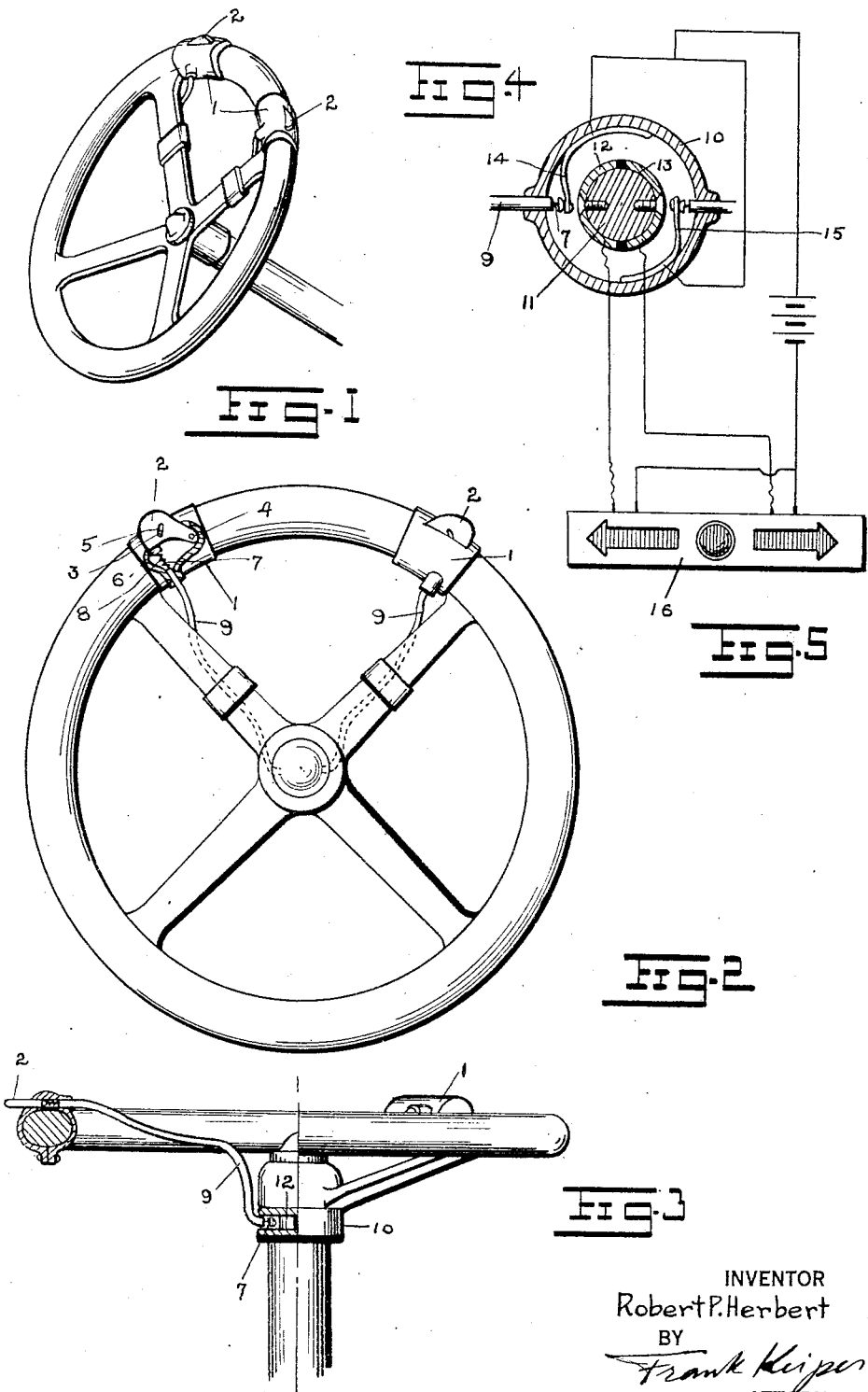

1,500,191

UNITED STATES PATENT OFFICE.

ROBERT P. HERBERT, OF ROCHESTER, NEW YORK.

SIGNALING SYSTEM.

Application filed August 22, 1922. Serial No. 583,507.

*To all whom it may concern:*

Be it known that I, ROBERT P. HERBERT, a citizen of the United States, residing at Rochester, in the county of Monroe and State of New York, have invented certain new and useful Improvements in Signaling Systems, of which the following is a specification.

The object of this invention is to provide a pair of switches that can be attached to the rim of a steering wheel of an automobile at predetermined points thereon so that on taking hold of the wheel at one of these points for the purpose of making a turn the grip of the hand on the wheel will automatically operate one of the switches and indicate on a suitable signal light the direction in which the car is about to turn.

These and other objects of this invention will be fully illustrated in the drawing, described in the specification and pointed out in the claims at the end thereof.

In the accompanying drawing:

Figure 1 is a perspective view of a steering wheel with the switches mounted thereon.

Figure 2 is a top plan view of the steering wheel and the switches mounted thereon.

Figure 3 is a partial sectional view and side elevation of a steering wheel and the switches mounted thereon.

Figure 4 is a horizontal sectional view of the contact members surrounding the steering column and forming part of the switches.

Figure 5 is an elevation of a signal light that may be operated by means of the switches mounted on the steering wheel.

In the several figures of the drawing like reference numerals indicate like parts.

The operation of many of the automobile signals used to indicate the direction in which the car is about to turn depends mainly on whether or not the driver of the car thinks of operating the switch or other mechanism that controls the signal. In other words the signal is not automatic in its operation but operates only by making some special movement of the hand or foot. In my present invention I have provided a pair of switches that are fastened to the steering wheel so that their operation is secured by the grip of the hand when turning the wheel.

In order to make a turn it is necessary to take hold of the wheel above the horizontal axis thereof in order to be able to give the wheel a large enough turn in either one or the other direction. The exact point where a driver takes hold of the wheel is of course more or less governed by his habits but in any event there is one point well up on each side of the wheel where he will grip the wheel in order to make a turn. The switches forming the subject matter of my invention are to be clamped to these points on the rim of the wheel.

As illustrated in the figures of the drawing, each of these switches comprises a suitable casing 1 forming a gripping handle which is adapted to be clamped to the rim of the steering wheel at the points above specified so as to be held securely in place thereon. In this casing is mounted the switch operating member or lever 2. This member is pivoted in the casing at 4 and a part thereof projects out thru an opening in the side of the casing. In order to make the switch operating member swing within predetermined limits a slot 5 is provided therein and a pin 3 mounted on the casing is adapted to project into this slot and form a stop for the switch member when either end of the slot is brought in contact with it.

Normally the switch member or lever 2 is forced outwardly into the position illustrated in Figure 2. This is done by the spring pressed button 6 carried on the end of the flexible shaft 7. As shown in Figure 2, an expansion spring 8 is interposed between the rear of the button 6 and the end of the flexible housing 9 surrounding the shaft 7 which forces the button and shaft against the rear of the switch operating member and normally holds it in this position.

The flexible shaft and its casing lead from the casing 1 to the under side of one of the spokes of the steering wheel and terminates in a circular housing 10 surrounding the column 11 below the steering wheel to which it is suitably fastened. On the steering column are mounted two semicircular contact plates 12 and 13 one at the right and the other at the left thereof, which plates are surrounded by the housing 10. On the inside of the housing 10 are mounted a pair of contact fingers 14 and 15, one at the end of each of the flexible shafts terminating in 11.

the housing. As the steering wheel is rotated the housing 10 rotates with it and moves the contact fingers 14 and 15 in front of the semicircular contact plates 12 and 13 which are held stationary on the steering column 11.

When one of the switch members is forced into its casing it forces the flexible shaft that rests against it thru its flexible housing so that the other end thereof moves out of the flexible housing against the contact finger located at the end thereof. This in turn depresses the spring contact finger and brings it in contact with the contact plate in front of it. The electrical circuit of which this particular contact plate forms a part is thus completed and lights one of the lights behind the arrows of the signal light 16. The particular light which it lights depends on the switch that has been operated. Thus when the switch on the left hand side of the center line of the steering wheel is operated the light in back of the arrow pointing to the left is lighted to indicate that the car is about to make a turn to the left while when the switch on the right hand side of the steering wheel is operated the arrow of the signal light pointing to the right is lit up.

The switches for lighting up the signal light in this manner are operated unconsciously by the driver of the car. Thus when he reaches up to take a hold near the top of the wheel at the left thereof in order to make a turn to the left he grips the switch mounted at this point on the rim of the steering wheel and in so doing forces the switch operating member of this switch into its casing with the result that the contact members within the housing 10 complete the electric circuit that lights up the arrow of the signaling light that points to the left. This then automatically indicates to the traffic in back of him that he is about to make a turn to the left.

Turning the steering wheel to the right produces the same result except that the arrow pointing to the right is lit up instead.

I claim:

1. In a switch for an automobile signaling device the combination of a casing adapted to fit the closed hand, means adapted to clamp said casing to the rim of a steering wheel, a switch operating member mounted within said casing and projecting out therefrom to form an irregular outline at a predetermined point on the outside of said casing so that by closing the hand to simultaneously grip the rim of the steering wheel and said casing prior to and during the turning of the steering wheel said switch operating member is automatically operated and kept in operative position.

2. In a switch for an automobile signaling device the combination of a casing adapted to fit the closed hand, means adapted to clamp said casing to the rim of a steering wheel, a switch operating member mounted within said casing and projecting out therefrom to form an irregular outline at a predetermined point on the outside of said casing so that by closing the hand to simultaneously grip the rim of the steering wheel and said casing prior to and during the turning of the steering wheel said switch operating member is automatically operated and kept in operative position and means to automatically allow said switch member to move back into its normal operative position on the partial release of the casing and the rim by the hand.

In testimony whereof I affix my signature.

ROBERT P. HERBERT.